United States Patent [19]

Ishida

[11] Patent Number: 4,901,250

[45] Date of Patent: Feb. 13, 1990

[54] GRAPHIC COMMUNICATION PROCESSING APPARATUS CAPABLE OF CHAINING GRAPHIC INFORMATION WITH A SMALL NUMBER OF PROCESSES

[75] Inventor: Tomotoshi Ishida, Hitachi, Japan

[73] Assignee: Hitachi, Ltd., Tokyo, Japan

[21] Appl. No.: 51,698

[22] Filed: May 20, 1987

[30] Foreign Application Priority Data

May 21, 1986 [JP] Japan ................................ 61-114616

[51] Int. Cl.⁴ ............................................. G06F 12/00
[52] U.S. Cl. ..................................... 364/521; 340/723
[58] Field of Search ................. 364/518, 521; 340/715, 340/723, 747, 750, 799

[56] References Cited

U.S. PATENT DOCUMENTS 4,698,625 10/1987 McCaskill et al. ............. 340/723 X
4,700,182 10/1987 Ohgami ........................... 340/747 X
4,731,609 3/1988 Reynolds et al. ............... 364/521 X
4,761,643 8/1988 Fujiwara ......................... 340/747 X Primary Examiner—David L. Clark
Assistant Examiner—Mark K. Zimmerman
Attorney, Agent, or Firm—Antonelli, Terry & Wands

[57] ABSTRACT

A graphic information processing apparatus of the type that graphic information is inputted from an input device to store the information in a memory, change it when necessary or display it on a display device. The memory includes a second memory area for storing a coordinate value of the graphic information, a first memory area for storing a geometric element defined by coordinate values and pointers indicating store areas storing the coordinate values, and a third memory area for storing a dimension value defined by a difference between two coordinate values and pointers indicating store areas storing the two coordinate values. When a coordinate value or a dimension value is changed, the graphic information processing apparatus changes also other necessary coordinate values or dimension values when such a change is executed.

16 Claims, 11 Drawing Sheets

GRAPHIC COMMUNICATION PROCESSING APPARATUS CAPABLE OF CHAINING GRAPHIC INFORMATION WITH A SMALL NUMBER OF PROCESSES

BACKGROUND OF THE INVENTION

The present invention relates to a graphic information processing apparatus and more particularly, to a graphic information processing apparatus suitable for application to a Computer-Aided Design (CAD) system.

CAD systems using graphic information processing apparatus are extensively used in manufacturing industries to lessen the burden in design work and to expedite it. The user of a graphic information processing apparatus initiates a process of inputting, changing or outputting a shape of an object to be designed, by using an input device such as a pointing device (tablet, digitizer, mouse and so on), a keyboard, a graphic display and etc. In each process, the position information of geometric elements of the object is supplied from the input device to the graphic information processing apparatus, in the form of key-inputted numeral information or pointing-device-inputted position information.

In a prior art graphic information processing apparatus disclosed, for example, in "Interface" 1984, pp. 226 to 273, the article "Shape Modelling and Graphic Process", a graphic figure is expressed by coordinate information and the geometric elements indicated by the coordinates, but pointers for identifying memory areas storing the coordinate information are not present.

If there occurs an operation error, a change in design, a change in approximate value indicated by a pointing device to a true value, a need of application to another graphic figure, etc., the user is requested to initiate a necessary process for changing the information stored in the graphic information processing apparatus. Among various processes, in a process for changing the position and dimension of geometric elements, the prior art graphic information processing apparatus automatically changes the geometric information stored therein such as coordinate information as the user identifies geometric elements to be changed and inputs the change amount of position and dimension and the resultant position and dimension.

Further, in judging if the coordinate values representative of the positions of geometric elements are identical, for example, in judging if two geometric elements are positioned at identical coordinate values, the prior art identity judging circuit performs such judgement based on the coordinate information (coordinate values) which has been stored together with the other information on geometric elements. For a case where an error occurs in calculating coordinate values, there is known an alternative identify judging circuit which judges based on the fact that an absolute value of a difference between two coordinate values is smaller than a predetermined value.

Information on dimension with tolerance inputted by the user is stored, as a correlation between geometric elements, in a dimension information memory area by a dimension addition/change circuit, as seen, for example, in the papers Nos. 104 and 109, at the 3rd Lecture on Design Automation Engineering held by both The Japan Society of Mechanical Engineers and The Japan Society of Precision Engineering.

For changing the dimension of a graphic figure stored in the graphic information processing apparatus, the user initiates a process provided in the apparatus by which the dimension and position of geometric elements are changed. There is known a circuit for automatically changing the dimension information in the memory areas, by using as dimension information the distances between a geometric element moving during the above process and other geometric elements. There is also known a process wherein if the user intends to input the position and dimension values of the shape of a graphic figure, provisional variables prepared beforehand are inputted instead of the position and dimension values, and thereafter the values substituted for the variables are changed.

The user actuates each of the above apparatus in accordance with various processes the user initiates to store graphic information in the memory area, and thereafter actuates a display to display thereon the graphic figure.

Figure 3:
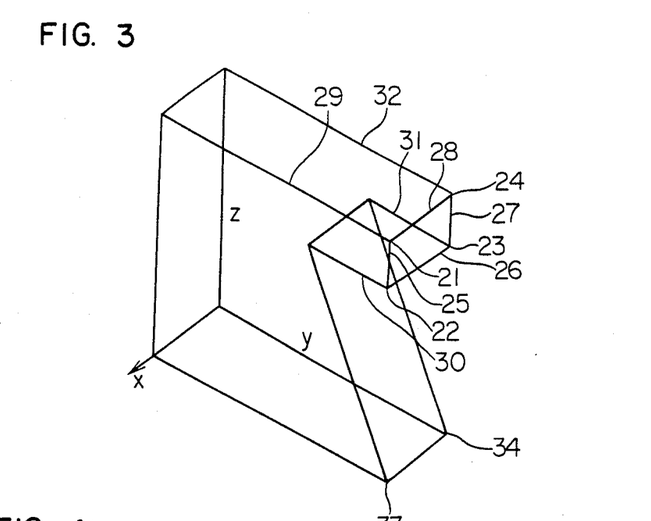
FIG. 3 shows a three-dimensional graphic figure in wire frame presentation defined by an xyz coordinate system.

For changing the shape, position and direction of a plurality of graphic figures stored in the memory by using a prior art graphic information processing apparatus, the user is requested to initiate a process for changing the coordinate information on the graphic figure, for every geometric element. The reason for this is that the coordinate values defining the positions of geometric elements are independently and separately stored in the prior art apparatus without correlation therebetween. For instance, in a graphic information processing apparatus storing a three-dimensional graphic figure in wire frame presentation defined by an xyz rectangular coordinate system as shown in FIG. 3, a shift of point 21 in the y axis direction by 10 mm can be achieved by changing the y coordinate value of point 21 stored in the memory area. However, shifts of points 21, 22, 23 and 24 and lines 25, 26, 27 and 28 in the y axis direction by 10 mm and resultant extensions of lines 29, 30, 31 and 32 must be performed through a plurality of processes to be initiated by the user. Since the number of processes is generally proportional to the number of geometric elements to be changed, a large number of processes are required for changing a number of elements, thus leading to a complicated operation. There is known a graphic information processing apparatus provided with a process for changing points and lines at a same time if they satisfy certain conditions. However, there is no means for judging if the conditions are met by chance or if the information satisfying such conditions is set intentionally. Therefore, it is impossible to automatically change points and lines only by one process. In the above example, if a graphic information processing apparatus is used, which is designed to change at a same time those points and lines which satisfy the conditions that the y coordinate value is identical to that of point 21, the information on points 22, 23 and 24 and lines 25, 26, 27 and 28 can be changed as desired, but the information on points 33, 34 and so on which should not be changed is also changed at that time.

To obtain a drawing from a three-dimensional graphic figure inputted in a graphic information processing apparatus, first it is transformed into a two-dimensional graphic figure and the necessary information such as dimension lines and notes are added thereto. To change the dimension of the graphic figure after such process, it is necessary to change the corresponding positions of both the three- and two-dimensional graphic figures in accordance with a change amount. In such case, it is necessary for a prior art graphic information processing apparatus to change the three- and two-dimensional graphic figures independently or to first change the three-dimensional graphic image and project it to form again the two-dimensional graphic image with dimension lines and notes again inputted or changed. The reason for this is that since the geometric elements of each graphic figure have their own separately stored coordinate values, only the coordinate values of one of the graphic figures can be changed at one process.

It is necessary for a graphic information processing apparatus to provide a circuit for comparing coordinate values and judging if a plurality of points are present at the same position, if a plurality of planes contact each other, and so on. It is impossible for a prior art graphic information processing apparatus to automatically and reliably compare all the combinations of coordinate values. Therefore, the user must sometimes initiate the apparatus by inputting the fact that the coordinate values are identical with each other. In particular, with the circuit for judging if coordinate values in the memory are identical to each other, there is a possibility that identical coordinate values are decided as different values. Namely, with a circuit which judges that there is an identity between two coordinate values if a difference between them is smaller than a predetermined value, a distance between two coordinate values may be decided as zero if the requested distance is smaller than a predetermined distance, even if a certain dimension is required between two coordinate values. Therefore, such a small distance cannot be processed by the apparatus.

Figure 4:
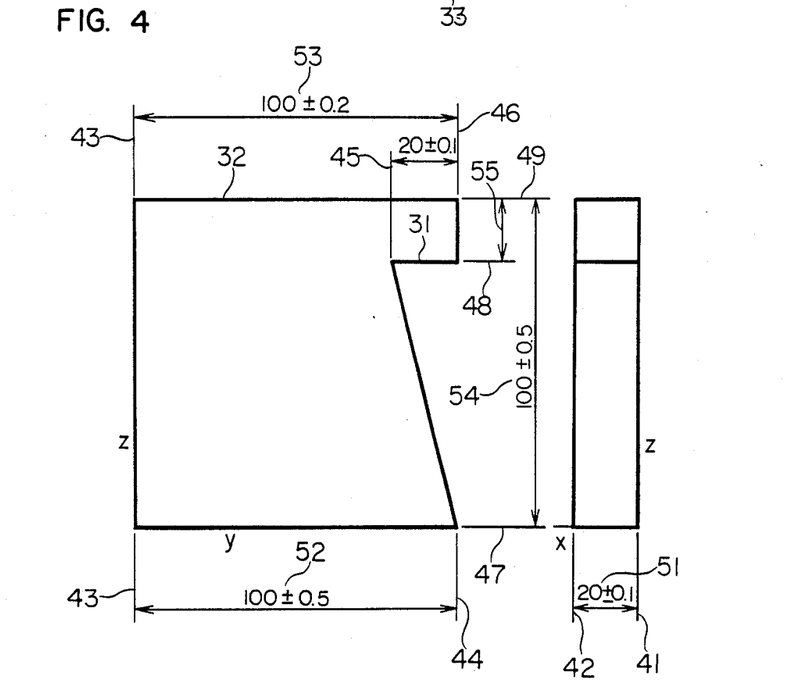
FIG. 4 shows an example of dimensions of the graphic figure shown in FIG. 3.

Consider a prior art graphic information processing apparatus storing information on a mechanical component shown in FIG. 4 in the memory. To extend a dimension at 54 in the x direction by 10 mm, first a process for moving a geometric element 32 on an extension line 49 is executed. Since a dimension at 55 is not changed with the above process, a geometric element 31 on an extension line 48 is also to be moved in the z direction, and a plurality of other necessary processes are to be executed. Alternatively, by previously setting the dimension at 54 as a variable, a value substituted for the variable is to be changed so as to extend the dimension at 54 in the z direction by 10 mm.

SUMMARY OF THE INVENTION

It is an object of the present invention to solve the above prior art problems and provide a graphic information processing apparatus capable of changing graphic information with a small number of processes.

To solve the above problems, the graphic information processing apparatus according to the present invention is provided with geometric information memory areas for storing topology and geometry information, position coordinate information and dimension information, which are not provided as constituent elements of a prior art apparatus. Each memory area stores pointers indicating areas storing the associated geometric element information. A plurality of coordinate information shared among the same or different geometric elements are stored as a single coordinate information in a single store area to use it in common among the geometric elements. Therefore, by changing the single coordinate information stored in the single store area, the plurality of coordinate information shared among the geometric elements are changed in unison at a time.

According to another aspect of the present invention, a process for changing a dimension of a single geometric element makes it possible to change the associated coordinate values using pointers, and other necessary coordinate values are also changed automatically by the use of pointers.

DESCRIPTION OF THE PREFERRED EMBODIMENTS

The present invention will be described in detail with reference to the accompanying drawings.

Figure 1:
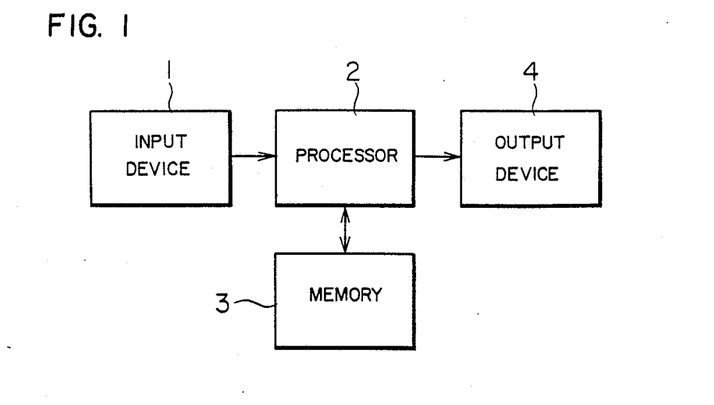
FIG. 1 is a block diagram showing the schematic arrangement of the graphic information processing apparatus according to the present invention.

FIG. 1 is a block diagram showing the schematic arrangement of the graphic information processing apparatus according to the present invention. In the Figure, an input device 1 converts graphic information inputted by the user into an electric signal. The input device 1 may be a keyboard, a digitizer (tablet), a magnetic tape or the like. A processor 2 processes the signal inputted from the input device 1 to store it into a memory 3. The processor also reads the graphic information stored in the memory 3 to output it to an output device 4 such as a display device.

Figure 2:
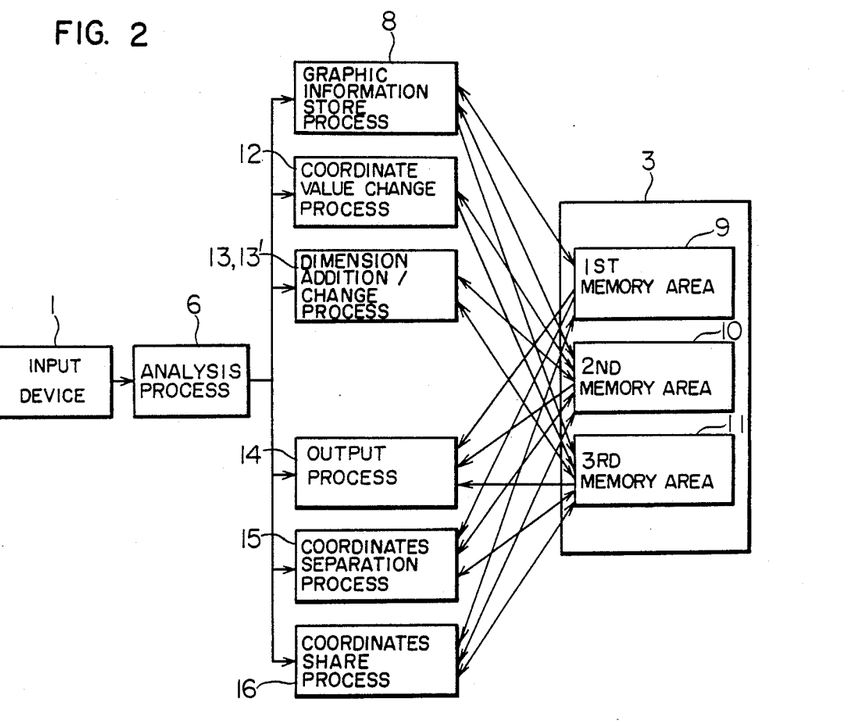
FIG. 2 is a view illustrating the schematic, functional arrangement of an embodiment of the apparatus according to the present invention.

FIG. 2 shows the functional arrangement of the graphic information processing apparatus according to the present invention. In the Figure, an analysis process analyzes for which process the input signal from the input device 1 requests, and selects a program executing the requested process.

When the analysis process 6 selects a graphic information store process 8, this process 8 stores the inputted graphic information in the memory 3 for each geometric element. The memory 3 is constructed of a first memory area 9 for storing topology information and geometry information on geometric elements, a second memory area 10 for storing coordinate values of geometric elements, and a third memory area 11 for storing dimension values of geometric elements. Each memory area also stores pointers indicating areas storing information on geometric elements concerned. Thus, if there are identical coordinate values among two or more coordinate information, a pointer indicates a single coordinate value store area to avoid duplicate storage.

The coordinate value change process 12 upon selection by the analysis process changes the coordinate value stored in the second memory area 10 in accordance with the inputted signal.

The dimension addition/change process 13 upon selection by the analysis process 6 stores new dimension information in the third memory area 11, or changes the dimension stored in the third memory area 11, respectively in accordance with the inputted signal. In the latter case, the coordinate value stored in the second memory area 10 is also changed as the value becomes necessary to be changed due to a change in the dimension stored in the third memory area.

The output process 14 upon selection by the analysis process 6 reads graphic information in the memory 8 to output and display the graphic figure on the output device 4 such as a display unit.

The coordinate separation process 15 upon selection by the analysis process 6 operates as follows: as the graphic information store process 8 executes a process for sharing a single common coordinate value for a plurality of coordinate values, there occurs a case where some coordinate values are requested to be changed separately from the others. To meet such a request, the coordinate values which must be separately changed are stored in another store area and the associated pointers are changed to indicate the other store area.

The coordinate share process 16, when it is selected, again shares the coordinate values separated by the coordinate separation process 15, or the coordinate share process 16 is executed when the coordinate value changed at the coordinate value change process 12 or at the dimension addition/change process 13 becomes equal to another coordinate value and it becomes convenient to share a single coordinate value for the two coordinate values.

A linear list or others may be used if a pointer to be stored in one store area must indicate a plurality of store areas. The coordinate information may be defined by a rectangular coordinate system, a circular cylindrical coordinate system, a spherical coordinate system, or other coordinate systems.

FIG. 3 is a three-dimensional graphic figure in wire frame presentation defined by an xyz rectangular coordinate system. Reference numbers 21 to 24 represent points, 25 to 32 represent line segments, and 33, 34 represent points. The dimensions with tolerance of the graphic figure are indicated as shown in FIG. 4.

In FIG. 4, reference numbers 41 to 49 are extension lines of which lines 41 to 46 indicate the x coordinate values and lines 47 to 49 indicate the z coordinate values. A plurality of coordinate points having the same coordinate value are located on the same extension line. Lines 51 to 55 indicate dimensions between extension lines.

Figure 5:
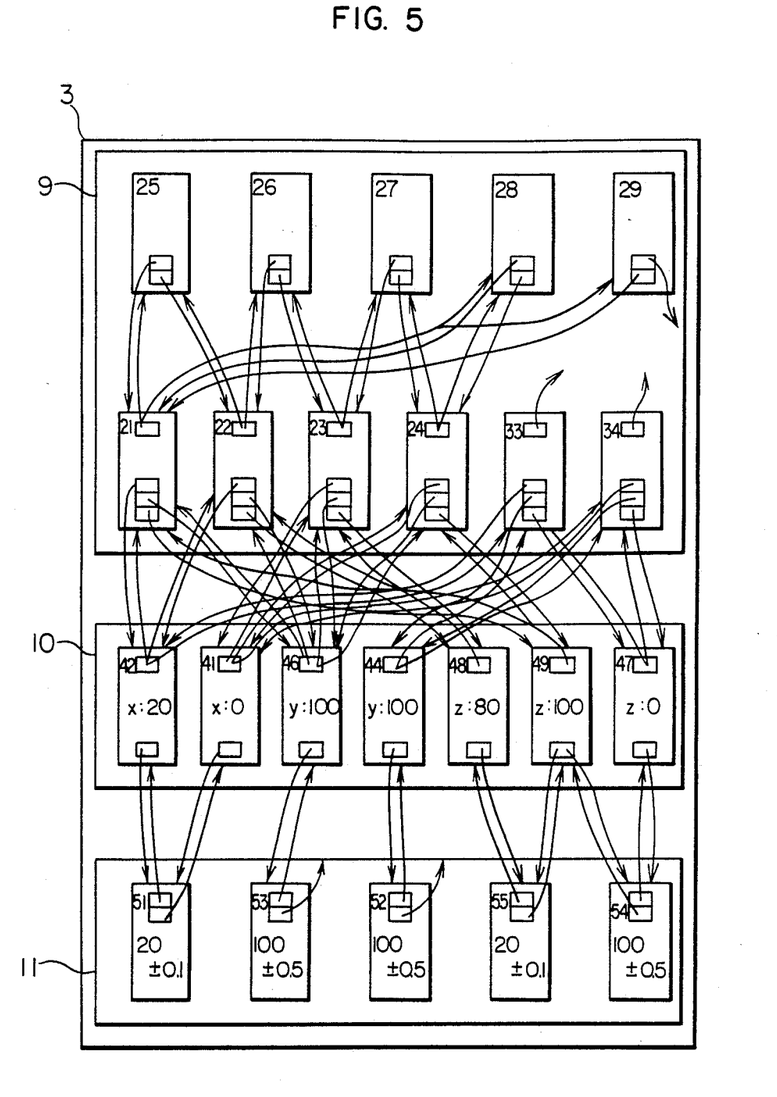
FIG. 5 shows an example of a status of the memory 8 of the graphic information processing apparatus in which the information on the graphic figure shown in FIGS. 3 and 4 is stored.

FIG. 5 shows the contents of each memory area 9, 10, 11 of the memory 3 storing the graphic information of the figure shown in FIGS. 3 and 4, and a correlation between the areas. The store areas corresponding to the store areas storing information on the geometric elements of FIGS. 3 and 4 are represented by identical reference numbers. In FIG. 5, reference numerals 21 to 24, 33 and 34 represent store areas for storing coordinate points corresponding to geometry information, 25 to 29 store areas for storing line segments corresponding to topology information, 41 to 49 represent store areas for storing coordinate values, and 51 to 55 represent store areas for storing dimension values.

More in particular, the store areas 21 to 24, 33 and 34 in the first memory area 9 are provided in one-to-one correspondence with each coordinate point. Each store area stores three pointers for indicating the store areas 41 to 49 in the second memory area 10 which stores the xyz coordinate values of the coordinate point concerned. Since even different coordinate points such as points 21, 22, 23 and 24 have the same y axis components, a single coordinate value y=100 is stored in the store area 46 of the second memory area 10 and their y axis pointers are arranged to indicate the same store area 46. Although the coordinate points 33 and 34 have the same y axis components as that of the coordinate points 21, 22, 23 and 24, the geometric elements associated with the former points should be processed separately from the elements associated with the latter points so that another y axis coordinate value y=100 is stored in the store area 44 and the pointer indicating the store area 44 is stored in the store areas 33 and 34. The store areas 41 to 49 also store the pointers which each indicate the store area whose pointer indicates the store areas 41 to 49 concerned. The above description has been directed to the y axis. The coordinate information for the x and z axes are stored in the similar manner as above.

The first memory area 9 includes store areas 25 to 29 for storing topology information of line segments. Since a line segment can be represented by using a line intersecting opposite points of the line segment, the store areas 25 to 29 each have two pointers indicating two coordinate points in the store areas 21 to 24, 33 and 34. In this case, the coordinate point store areas each have a pointer indicating the line segment store area.

The third memory area 11 includes store areas 51 to 55 storing dimensions with tolerance. Since a dimension is represented by a difference between two coordinate values, each dimension store area has two pointers indicating the store areas in the second memory area storing two coordinate values regarding the dimension concerned. The store areas 41 to 49 each has a pointer indicating a store area in the third memory area 11.

Next, the various processes shown in FIG. 2 will be described one after the other with reference to FIGS. 2 to 11.

Figure 6:
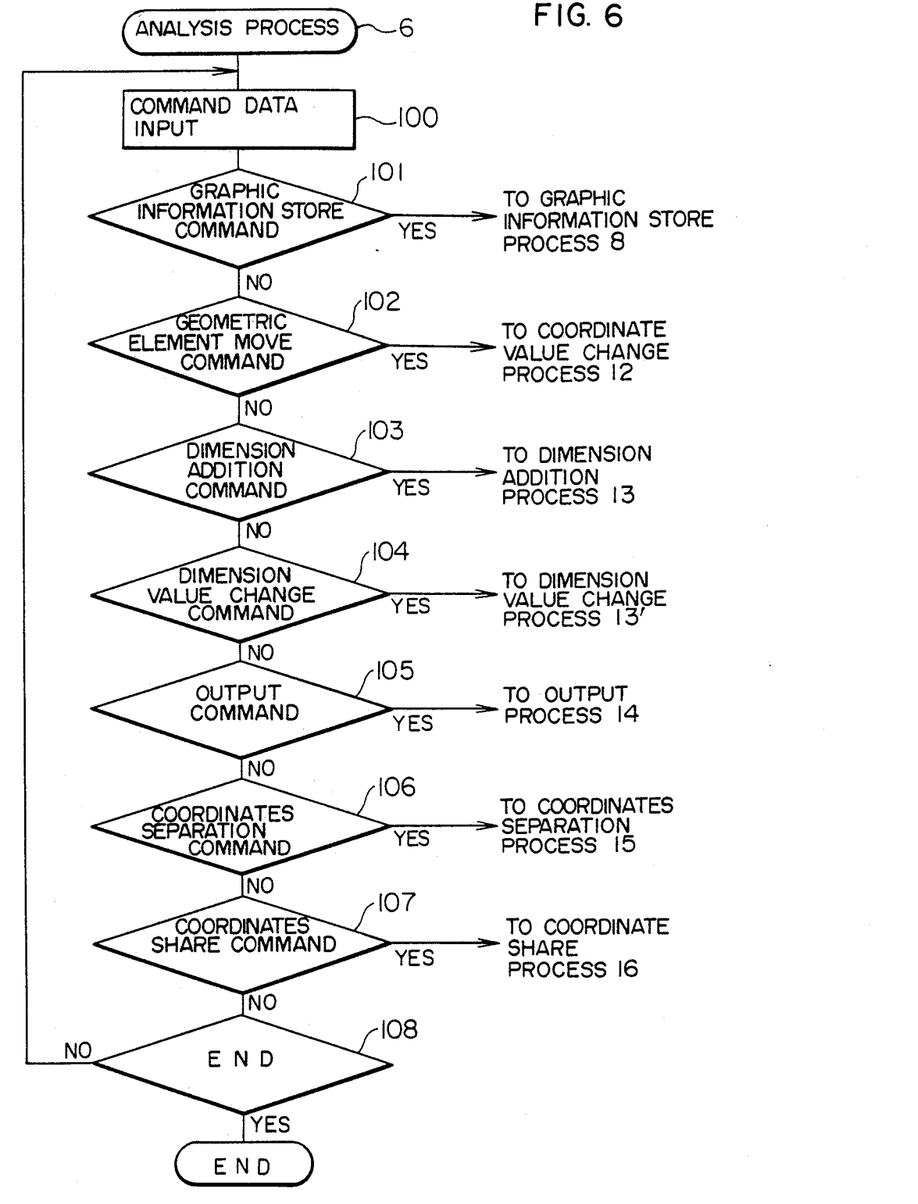
FIG. 6 is a flow chart illustrating the analysis process shown in FIG. 2.

First, the analysis process 6 will be described referring to FIG. 6. A command data is inputted from the input device at step 100. The command data is discriminated at step 101 if it is a graphic information store command or not. If YES, the flow advances to the graphic figure store process 8. If NO, the inputted command data is discriminated at the next step 102 if it is a geometric element move process or not. If YES, the flow advances to the coordinate value change process 12. If NO, the flow advances to the next step 103. Similarly, steps 104 to 107 are executed to select the dimension addition process 13, the dimension value change process 13', the output process 14, the coordinate separation process 15 and the coordinates share process 16. It is judged at step 108 if there is an indication representative of the end of a common data input at step 100. If NO, the step 100 resumes, whereas if YES, the process terminates.

Figure 7:
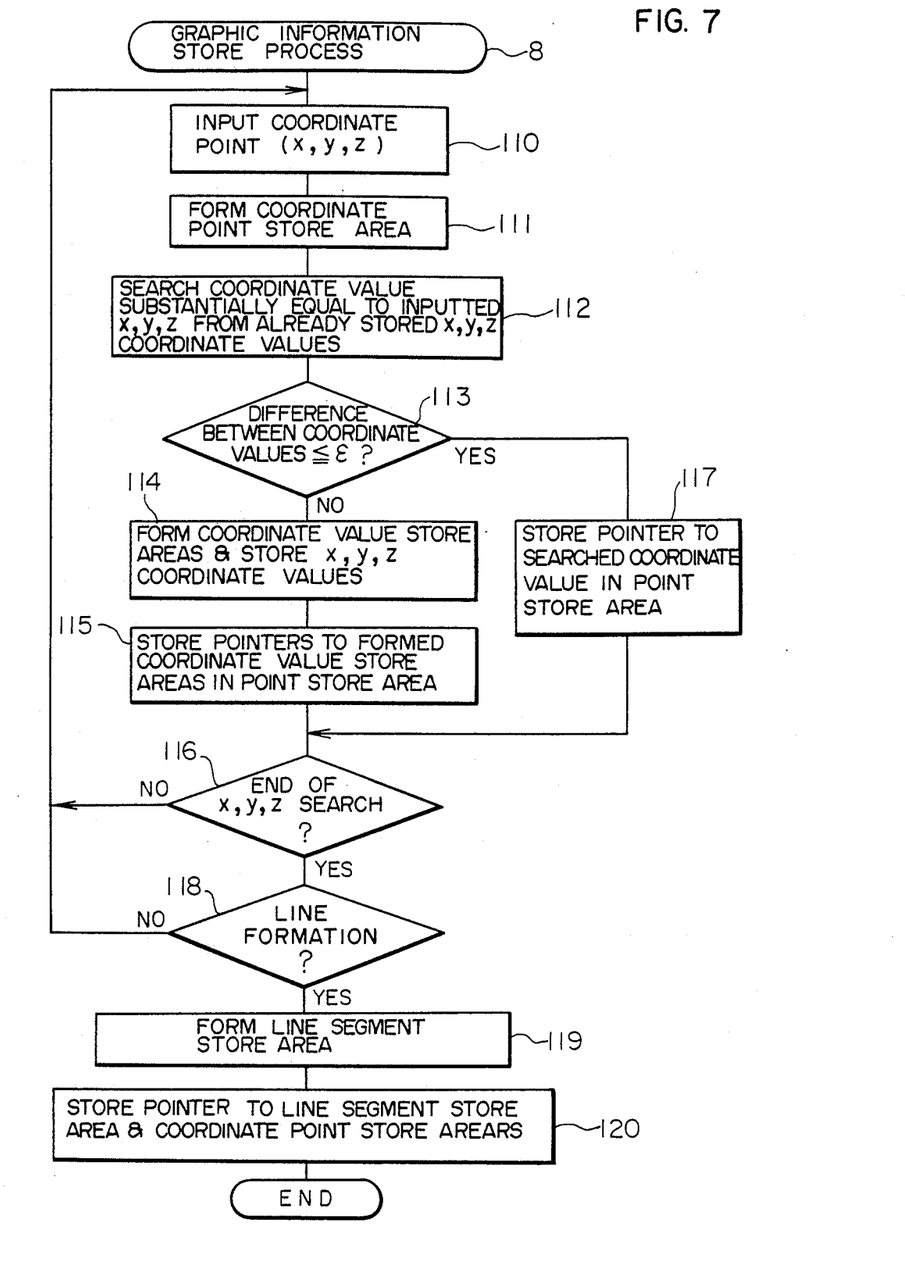
FIGS. 7 to 11 are flow charts illustrating the branched processes at the flow chart of FIG. 6, respectively of a graphic figure information store process, a coordinate value change process, dimension addition and dimension value change processes, a coordinate separation process, and a coordinate share process.

If the inputted command data is judged as a graphic information store command at the analysis process 6, the flow advances to the graphic information store process 8 shown in FIG. 7. This graphic information store process will be described using the example of the graphic figure shown in FIGS. 3 to 5.

Referring to FIG. 7, when a coordinate point (x, y, z) is inputted from the input device 1 at step 110, the coordinate point is set in the first memory area 9 shown in FIG. 5 at step 111. At the next step 112, the coordinate value nearest to each of the inputted coordinate values x, y and z is searched at step 112 from those values already stored in the second memory area 10. It is determined at step 113 if a difference between the searched coordinate value and the inputted coordinate value for each axis x, y and z is smaller than a predetermined value $\epsilon$. If NO, since a coordinate value to be shared is not still stored, at step 114, a new coordinate value is provided in the second memory area 10 to store each coordinate value x, y and z. At step 115, pointers indicating the coordinate value store areas are stored in the coordinate point store area. At step 116, it is judged if each coordinate value x, y and z has been stored. If NO, the flow returns to step 110.

If YES at step 113, since a coordinate value already stored can be shared, a pointer indicating the searched coordinate is stored in the newly provided coordinate point area in the first memory area 9, and thereafter the flow advances to step 116.

If all the coordinate values x, y and z have been stored at step 116, then the decision at step 116 becomes YES and the flow advances to step 118 where it is judged if a line can be formed or not. If NO at step 118, step 110 resumes, whereas if YES a line segment store area is newly provided in the first memory area 9 at step 119. At step 120 two pointers indicating the coordinate values representative of the opposite ends of the line segment are stored in the line segment store area and, the pointers to the line segment store areas are also stored in the coordinate point store areas.

Figure 8:
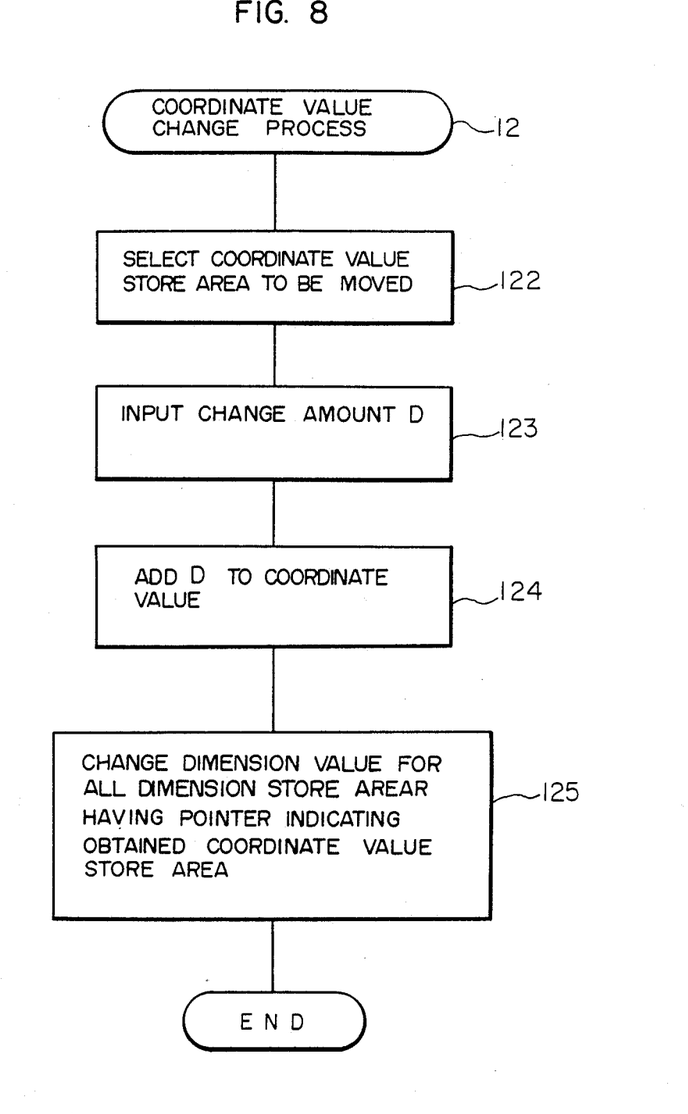

If the coordinate value change process is selected at the analysis process 6, the processes as shown in FIG. 8 are executed.

Referring to FIG. 8, a coordinate value store area C to be moved is inputted at step 122 from the input device 1, and the change amount D of the coordinate value is inputted at step 123 from the input device. Then, at step 124 the change amount D is added to the coordinate value in the coordinate value store area C. At step 125, a dimension value in the dimension store area of the third memory area 11 which has a pointer indicating the obtained coordinate value, is changed due to the change in the coordinate value. Then the process terminates.

Figure 9:
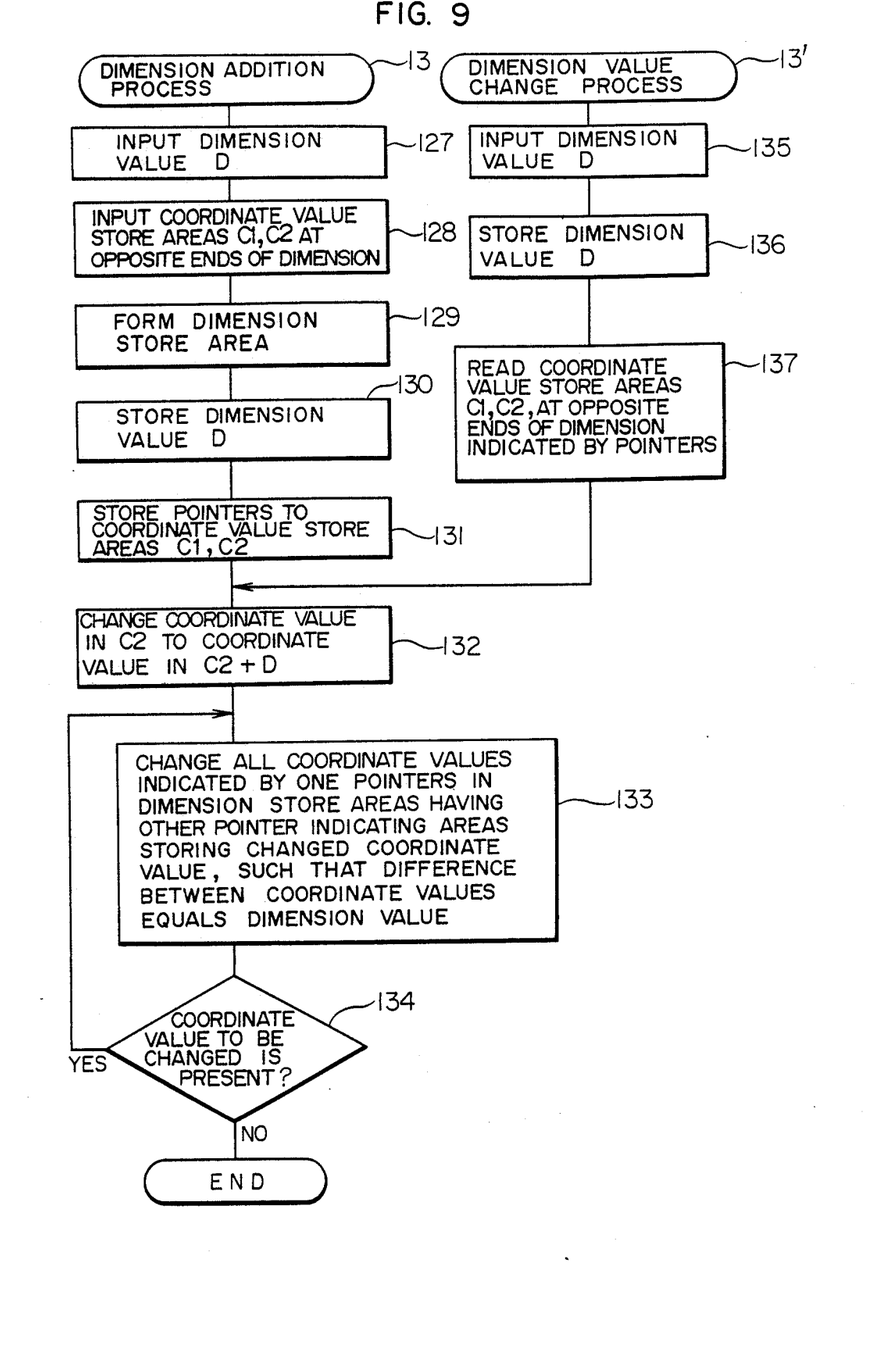

FIG. 9 shows a process flow to the executed if the analysis process 6 selects the dimension addition process 13 or the dimension value change process 13'.

If the dimension addition process 13 is selected, a dimension value D is inputted at step 127 and the coordinate value store areas C1 and C2 at opposite ends of the dimension are inputted at step 128. Then, at step 129, a dimension store area for storing the inputted dimension is provided in the third memory area 11 in which the dimension D is stored at step 130. At step 131 the pointers indicating the coordinate value store areas C1 and C2 for storing the opposite-end coordinate values are stored in the dimension area concerned. Next, at step 132 the coordinate value in the store area C2 is changed to a coordinate value obtained by adding the dimension D to the coordinate value in the store area C1. At step 133 all the coordinate values in coordinate value store areas indicated by pointers in other dimension store areas having the another pointers indicating the areas C2 storing the changed coordinate value, are changed such that a difference between the coordinate values indicated by one and the other pointers in the other dimension store areas becomes dimension values stored in the other dimension store areas, respectively. At step 134 it is judged if there is any coordinate value to be changed due to the change of the coordinate value at step 133. If YES, the flow returns to step 133, whereas if NO, the flow terminates.

If the dimension value change process 13' is selected, a dimension value D to be stored newly is inputted at step 135, and the dimension value D is stored in the dimension value store area at step 136. At step 137, using the pointers indicating the opposite-end coordinate values of the dimension, the two coordinate value store area C1 and C2 are read. Thereafter, steps 132 and 133 are executed in the similar manner as above.

Figure 10:
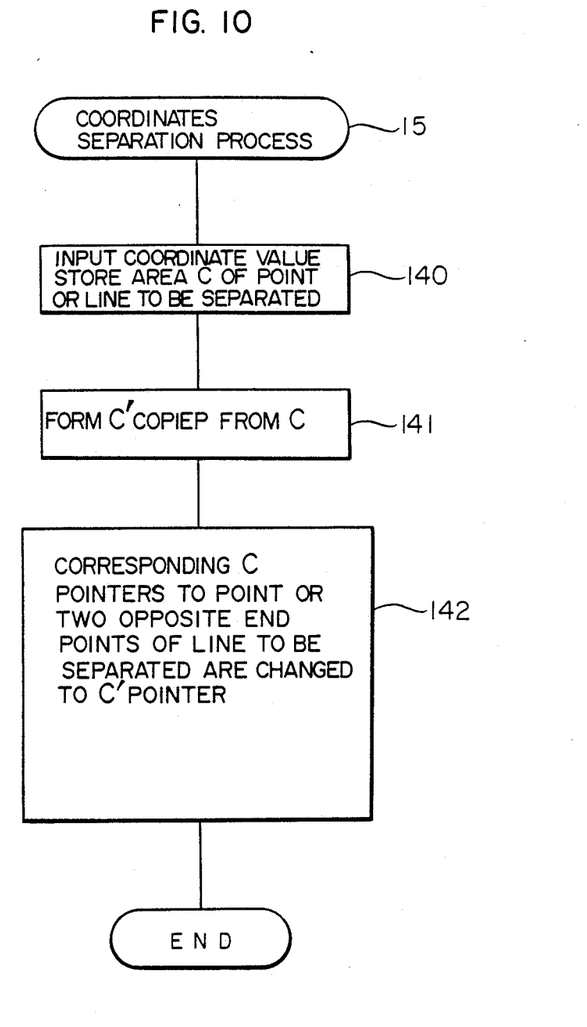

FIG. 10 is a flow chart to be executed when the analysis process 6 selects the coordinate separation process 15. In this case, a coordinate value store area C to be separately processes is selected at step 140. Then step 141 a store area C' storing a copied value or values of the coordinate value or values in the coordinate value store area C is provided in the second memory area 10. At step 142, the corresponding pointers to the point or the two opposite-end points of the line to be separately processed, are changed so as to indicate the new coordinate value store areas C'. Then the flow terminates.

Figure 11:
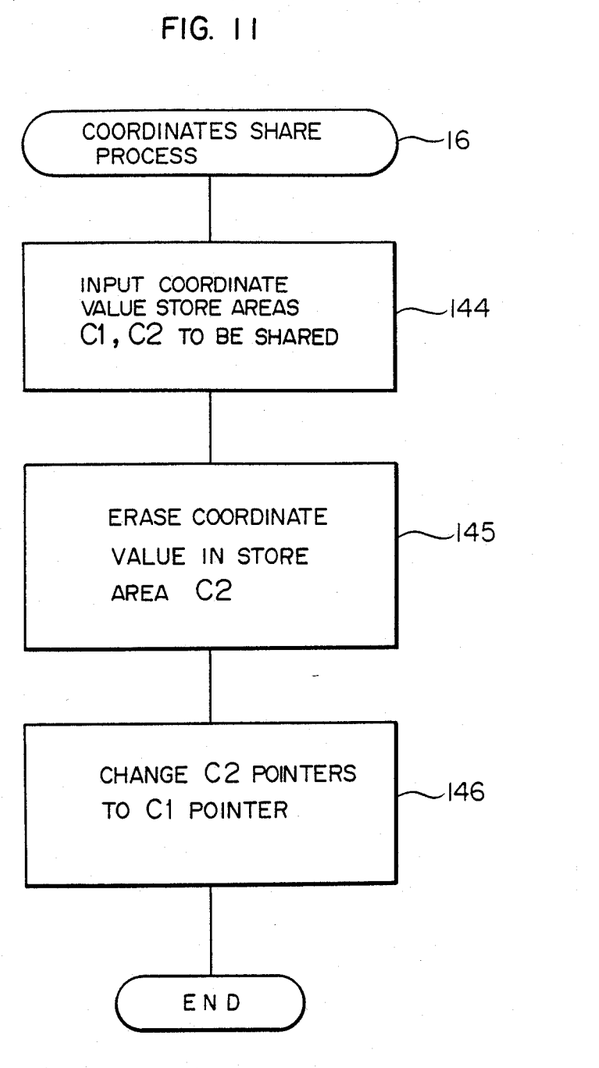

FIG. 11 is a flow chart to be executed when the coordinate share process 16 is selected at the analysis process 6. In the Figure, first two coordinate value store areas C1 and C2 to be shared are selected at step 144. Next at step 145, a coordinate value stored in the coordinate value store area C2 is erased. At step 146 all the pointers indicating the coordinate value store area C2 are changed to indicate the coordinate value store area C1 to thereby terminate the flow.

The output process 14 is executed in the similar manner as conventional.

By properly executing the processes described above, the following particular processes can be attained.

For example, since a line segment 25 shown in FIG. 3 intersects points 21 and 22, the graphic information store process 8 stores pointers to the two coordinate point store areas 21 and 22 in the line segment store area 25. In one coordinate point store area 21, pointers to the coordinate value store areas 42, 46 and 49 in the second memory area 10 storing the coordinate values (x, y, z) of the one coordinate point are stored. Thus, the point 21 is expressed as present at the coordinates (20, 100, 100). Similarly, the shape data together with the dimensions of the graphic figure shown in FIGS. 3 and 4 are stored in the form as shown in FIG. 5.

Since the points 21 and 22 of the graphic figure shown in FIG. 3 have the same y coordinate value, the two coordinate point store areas are made to store the pointers to the same coordinate value store area 46 at steps 113 and 117 in the graphic information store process 8 shown in FIG. 7. The y coordinate values of the points 21 and 33 are both 100 as seen from the coordinate value store areas 46 and 44. However, the two points are at the same coordinate value by chance (the designer does not locate the two points at the same coordinate intentionally). Therefore, in order to make it possible to move the two points separately at the coordinate separation process 15, the coordinate values of the two points are stored in different coordinate value store areas. As a result, as the coordinate value change process 12 makes the coordinate values in the coordinate value store areas change, the points 21, 22, 23 and 24 move but the point 33 remains unchanged.

For example, the dimension at 54 shown in FIG. 4 is a distance between the z coordinate value at 47 and the z coordinate value at 49. Therefore, the dimension addition/change process 13 stores the pointers to the coordinate value store areas 47 and 49 of the second memory area 10 in the dimension store area 54 of the third memory area 11 shown in FIG. 5, and also stores the dimension with tolerance 100±0.5 in the dimension store area 54.

To change the dimension at 54 shown in FIG. 4, the dimension value change process 13' first changes the dimension in the dimension store area 54, and in turn changes the coordinate values in the coordinate value store areas 47 and 49 indicated by the pointers in the dimension store area 54. The dimension value change process 13' further identifies the dimension store area 55 in the third memory area 11 indicated by the pointer in the coordinate value store area 49, and the coordinate value store area 48 in the second memory area 10 indicated by the pointer in the dimension store area 55, to thereby store the value obtained by subtracting the coordinate value at 49 by the dimension value at 55 in the coordinate value store area 48. With the above operation, the graphic information stored in the memory 8 can be changed correctly by a single dimension value change process. For example, if the dimension at 54 is to be changed to 110±0.5, the coordinate value at 49 is made $z=110-20$ using the coordinate value at 47 as a reference. Then, using the coordinate value at the dimension store area 55, the coordinate value at 48 is changed to $z=110-20=90$. Therefore, with the z coordinate values of the points 21, 24 and so on the extension line 49 becoming all 110, the z coordinate values of the line segments 28, 29, 32 and so on become all 110. Also, with the z coordinate values of the points 22, 23 and so on on the extension line 48 becoming all 90, the z coordinate values of the line segments 26, 30, 31 and so on become all 90.

In this state, upon actuation of the output device 4, the graphic figure after the change of the dimension at 54 is outputted.

Figure 12:
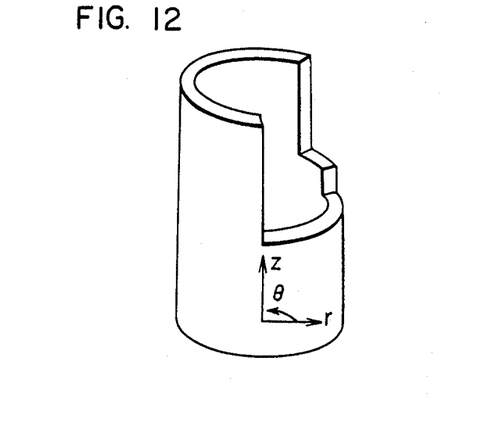
FIG. 12 shows a three-dimensional graphic figure in solid presentation defined by an $r\ \theta\ z$ circular cylindrical coordinate system.
Figure 13:
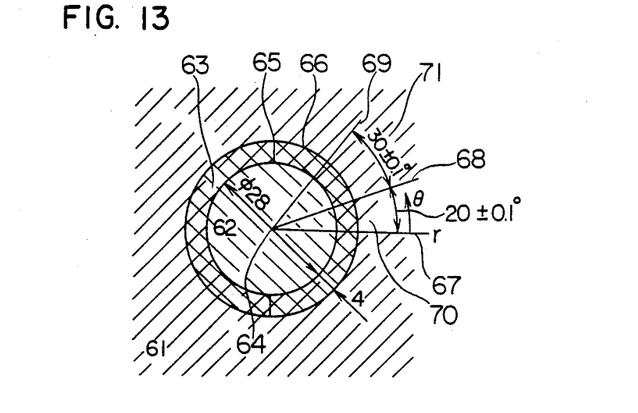
FIGS. 13 and 14 are examples of dimensions of the graphic figure of FIG. 12.
Figure 14:
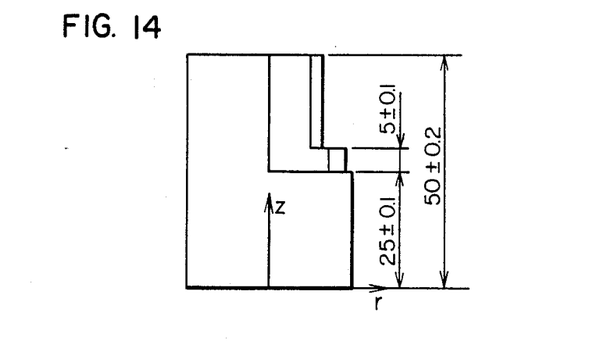
Figure 15:
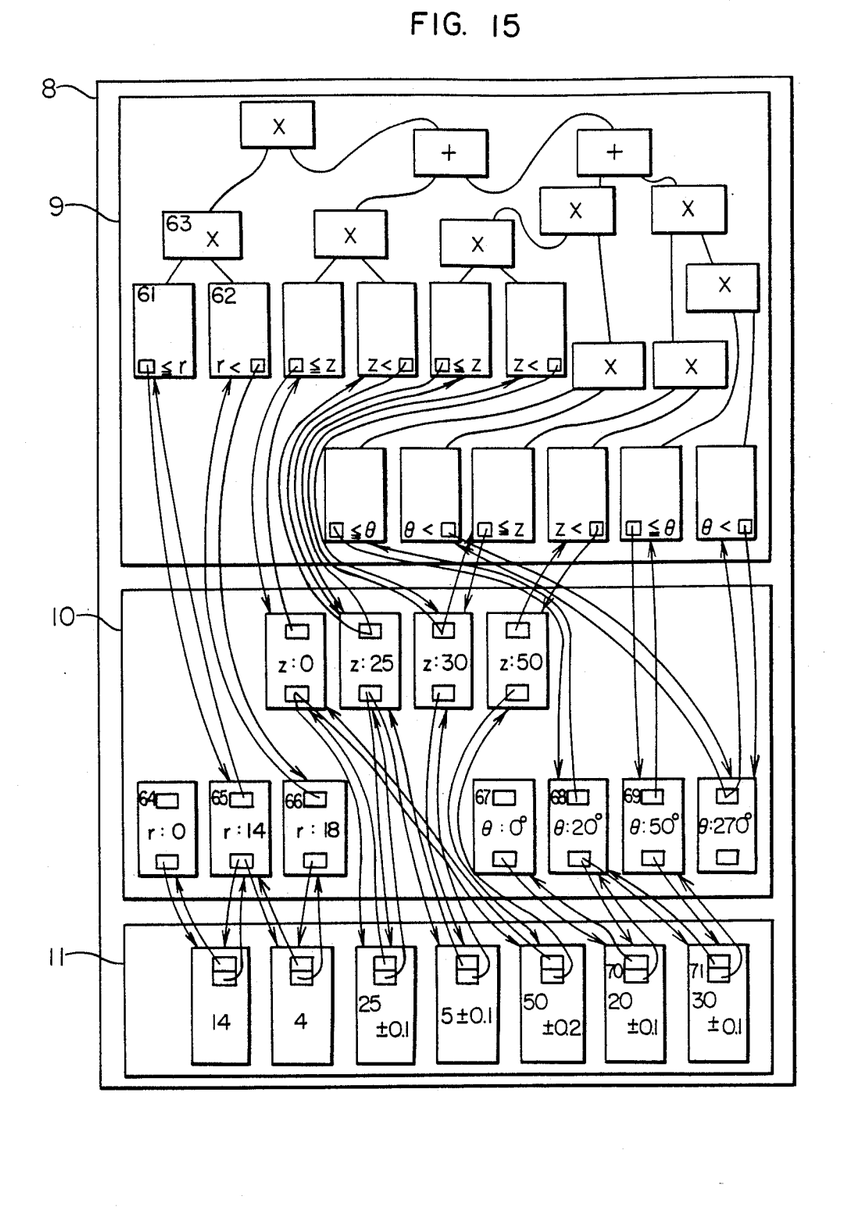
FIG. 15 shows an example of a status of the memory of the graphic information processing apparatus in which the information of the graphic figure shown in FIGS. 12 to 14 is stored.

FIG. 12 is a three-dimensional figure in solid presentation defined by the r θ z circular cylindrical coordinate system. The graphic information of the figure with dimensions fixed as shown in FIGS. 13 and 14 can be stored in the memory as shown in FIG. 15 using the graphic information processing apparatus shown in FIGS. 2, 6 to 11. In FIGS. 12 to 15, reference numbers 61 to 63 represent the solid body and its store areas, 64 to 69 represent the coordinates representative of planes and their coordinate store areas, and 70 and 71 represent the angle corresponding to the above-described dimension and its store areas. The information shown in FIGS. 13 and 14 is stored in the store areas having the identical reference numbers in FIG. 15. Geometric elements are stored as binary trees of the generally used CGS (Constructive Solid Geometry) type (e.g., see "PIXEL" No. 13, pp. 92 to 97). For example, a hollow cylinder 60 of infinite length can be expressed as a superposed portion of a solid body 61 (indicated by left-side-down hatched lines) upon a solid body 62 (indicated by right-side-down hatched lines). The solid body 61 is obtained by infinitely extending the inner surface 65 of a cylinder in the ±z direction, while the solid body 62 is obtained by infinitely extending the outer surface 66 in the ±z direction. In this case, the hollow cylinder 63 is stored in the upper left of FIG. 15 as the product of the solid body 61 and the solid body 62, assuming that the portion where the solid body 61 is present is represented by "1", the hollow cylinder portion is represented by "0", and similarly the portion where the solid body 62 is present is represented by "1", and the other portion is represented by "0". However, as to the definition of a leaf of the binary three, for example, the solid body 61, an inequality itself representative of the occupying region of a solid body is not stored in a solid body store area as conventional. Instead, according to the present invention, a pointer to the coordinate value store area 65 in the second memory area 10 in which the coordinate value r=14 is stored, is stored. For instance, with an inequality 14≦r defining the solid body 61, 14 representative of the coordinate value is stored as a pointer to the store area 65 where the coordinate value 14 is stored.

The dimension store area for an angle value stores two pointers to the store areas of opposite-end coordinate values of the dimension, and the dimension value with tolerance. For example, an angle value at 70 is a distance between the coordinate values at 67 and 68. Therefore, the dimension store area 70 stores two pointers to the coordinate value store areas 67 and 68, and a dimension value with tolerance 20±0.1°.

To change the angular dimension value at 70 shown in FIG. 13, first the coordinate values at the coordinate value store areas 67 and 68 each having a pointer to the dimension value store area 70 are changed. Then the coordinate values in the coordinate value store area 68 and in the coordinate value store area 69 associated with the dimension value store area 71 are changed. With the above operation, the graphic figure can be changed correctly with a single dimension change process. For example, to change the dimension value at 70 to 25±0.1°, the dimension value change process 13' makes the coordinate value at 68 change to θ=25° using the coordinate value at 67 as a reference value, and change the coordinate value at 69 to θ=55°, to thereby correctly change the graphic information while the change in the dimension at 70 is executed.

According to the present invention, the user of a CAD system can change the graphic information by merely changing a dimension value at a dimension line in a manner generally adopted in designing. In addition, it is possible to reduce the number of operations required for changing the graphic information.

I claim:

1. A graphic information processing apparatus comprising:
    an input device for inputting graphic information, including coordinate values for a plurality of coordinate points of graphic data, and process command data for said graphic information;
    a memory having first and second memory areas for storing graphic information received from said input devices;

a display device for displaying said graphic information stored in said memory; and a processor connected to receive said process command data from said input device, and including graphic information store means for storing said graphic information from said input device in said memory, stored information change means for changing graphic information stored in said memory; display means for reading graphic information stored in said memory and for supplying said read graphic information to said display device and means responsive to said process command data from said input device for operating one of said graphic information store means, said store information change means and said display means;

wherein said graphic information store means comprises:

coordinate value store means for storing coordinate values of each coordinate point of said graphic information from said input device in said second memory area; and coordinate point store means for storing in said first memory area data representing each coordinate point and pointers indicating store areas of said coordinate values stored in said second memory area.

2. A graphic information processing apparatus according to claim 1, wherein said coordinate value store means comprises:

means for searching the coordinate values stored in said second memory area for a coordinate value substantially equal to each of said inputted coordinate values; and means for not storing said inputted coordinate value when said searching means has found a coordinate value substantially equal to said inputted coordinate value, and storing said inputted coordinate value in said second memory area when said searching means has found no coordinate value substantially equal to said inputted coordinate value.

3. A graphic information processing apparatus according to claim 2, wherein said coordinate point store means comprises means for storing, when said searching means has found a coordinate value substantially equal to said inputted coordinate value, a pointer indicating a coordinate value store area for the already stored coordinate value judged as substantially equal to said inputted coordinate value, in the corresponding coordinate point store area of said first memory.

4. A graphic information processing apparatus according to claim 3, wherein said processor further comprises coordinate value separation means which is operated in accordance with said inputted graphic information, said coordinate value separation means including:

means for indicating a coordinate point to be processed separately from a plurality of coordinate points indicated by data stored in said first memory area, said plurality of coordinate points each having a pointer indicating one coordinate value stored in said second memory area;

means for storing said one coordinate value in one store area in said second memory area; and means for changing said pointer indicating said one coordinate value in data representing said coordinate point indicated by said indicating means to a pointer indicating said one store area.

5. A graphic information processing apparatus according to claim 2, wherein said searching means comprises means for judging whether a difference between said inputted coordinate value and an already stored coordinate value is smaller than a predetermined value.

6. A graphic information processing apparatus according to claim 2, wherein said stored information change means comprises means for changing a coordinate value stored in said second memory in accordance with said inputted graphic information.

7. A graphic information processing apparatus according to claim 1, wherein said graphic information store means further comprises means for storing in an area of said first memory area pointers indicating the plurality of coordinate points of the graphic data among the coordinate points indicated by the data stored by said coordinate point store means.

8. A graphic information processing apparatus according to claim 1, wherein said stored information change means comprises means for changing a coordinate value stored in said second memory area in accordance with said inputted graphic information.

9. A graphic information processing apparatus according to claim 1, wherein said memory further comprises a third memory area; and said graphic information store means further comprises dimension addition means for storing in a dimension store area of said third memory area a dimension value between positions indicated by two coordinate values of said coordinate values included in said inputted graphic information among the coordinate values stored in said second memory area and pointers indicating the coordinate store areas storing said two coordinate values.

10. A graphic information processing apparatus according to claim 9, wherein said dimension addition means further comprising coordinate value change means for changing one of said two coordinate values such that said dimension value becomes equal to a difference between said two coordinate values.

11. A graphic information processing apparatus according to claim 10, wherein said dimension addition means further comprises means for changing a coordinate value indicated by a pointer in a dimension store area different from the dimension store area which stores said dimension value and said pointers from said dimension addition means, said different dimension store area having another pointer indicating a store area storing the coordinate value changed by said coordinate value change means, so that a difference between the coordinate value indicated by said other pointer and the coordinate value to be changed becomes equal to the dimension value in said different dimension store area.

12. A graphic information processing apparatus according to claim 9, wherein said stored information change means comprises:

dimension value change means for changing a dimension value stored in said third memory area by said dimension addition means; and coordinate value change means for changing one of the two coordinate values in said second memory area indicated by pointers in the store area storing said changed dimension, so that a difference between the two coordinate values indicated by said pointers becomes equal to said changed dimension value.

13. A graphic information processing apparatus according to claim 12, wherein said coordinate value change means further comprises means for changing a coordinate value indicated by a pointer in a dimension store area different from the dimension store area storing said dimension value changed by said dimension value change means, said different dimension store area having another pointer indicating a store area storing said coordinate value which has been changed by said coordinate value change means so that a difference between the coordinate value indicated by said other pointer and the coordinate value to be changed becomes equal to the dimension value in said different dimension store area.

14. A graphic information processing apparatus according to claim 9, wherein said stored information change means comprises:
means for changing a coordinate value stored in said second memory area; and
means for changing all dimension values stored in all of the dimension value store areas of said third memory area, said dimension value store areas all having a pointer indicating the store area storing said coordinate value changed by said coordinate value change means, to a value equal to a difference between said changed coordinate value and a coordinate value indicated by another pointer of each of said dimension store areas.

15. A graphic information processing apparatus according to claim 14, wherein said coordinate value change means comprises means for inputting the change amount of said coordinate value to be changed, and means for adding said inputted change amount to a coordinate value to be changed in said coordinate store area.

16. A graphic information processing apparatus according to claim 1, wherein said processor further comprises coordinate value share means which operates in accordance with said inputted graphic information, said coordinate value share means including:
means for identifying a plurality of coordinate value store areas in said second memory including one coordinate value store area to be shared;
means for changing pointers in said first memory area indicating said identified coordinate value store areas other than said one coordinate value store area to be shared to a pointer indicating said one coordinate value store area to be shared.

* * * * *